United States Patent [19]

Archer et al.

[11] Patent Number: 5,006,744
[45] Date of Patent: Apr. 9, 1991

[54] INTEGRATED ELECTRONICALLY COMMUTATED MOTOR AND CONTROL CIRCUIT ASSEMBLY

[75] Inventors: William R. Archer; Peter B. Lytle; Rajendra K. Shah; John E. Wynberry, all of Fort Wayne, Ind.

[73] Assignee: General Electric Company, Fort Wayne, Ind.

[21] Appl. No.: 290,031

[22] Filed: Dec. 27, 1988

[51] Int. Cl.⁵ .................... H02K 11/00; H02K 5/18; H02K 5/02; H02P 7/06
[52] U.S. Cl. .......................................... 310/89; 310/58; 310/68 R; 310/64; 318/254
[58] Field of Search ............... 310/58, 64, 71, 89, 310/91, 62, 68 R, 64, 71, 89, 91; 318/138, 254, 138, 254

[56] References Cited

U.S. PATENT DOCUMENTS

| 3,444,406 | 5/1969 | Aha | 310/195 |
|---|---|---|---|
| 3,457,486 | 7/1969 | Soeda | 318/331 |
| 3,531,702 | 9/1970 | Hill | 318/138 |
| 3,604,960 | 9/1971 | Krestel | 310/50 |
| 3,787,014 | 1/1974 | Story et al. | 310/91 |
| 3,878,809 | 4/1975 | Ray | 310/62 |
| 4,004,202 | 1/1977 | Davis | 318/138 |
| 4,384,224 | 5/1983 | Spitler et al. | 310/89 |
| 4,544,856 | 10/1985 | King | 310/71 |
| 4,642,885 | 2/1987 | King | 310/71 |
| 4,668,898 | 5/1987 | Harms | 318/254 |
| 4,712,030 | 12/1987 | Lakin et al. | 310/89 |

FOREIGN PATENT DOCUMENTS

224785 6/1987 European Pat. Off. .
1905624 12/1977 Fed. Rep. of Germany .
2185536 7/1987 United Kingdom .

Primary Examiner—Steven L. Stephan
Assistant Examiner—C. LaBalle
Attorney, Agent, or Firm—Ralph E. Krisher, Jr.

[57] ABSTRACT

A motor assembly includes a stationary assembly having a plurality of winding stages adapted to be electrically energized to generate an electromagnetic field and a rotatable assembly including a plurality of permanent magnet elements in magnetic coupling relation with the stationary assembly. The motor assembly also includes first and second substantially flat end members parallel to each other and having inner facing sides between which the stationary assembly and the rotatable assembly are located. Each of the members has an outer side opposite its inner side. Control circuitry is connected to the winding stages and positioned adjacent the outer side of the first member, for applying a voltage to one or more of the winding stages at a time and for commutating the winding stages in a preselected sequence to rotate the rotatable assembly about an axis of rotation. A cap on the outer side of the first member forms a closure with the first member within which the control circuitry is located. A connecting element engages the second end member and the cap and is adapted to urge the second end member and the cap toward each other thereby supporting the first end member, the stationary assembly and the rotatable assembly therebetween. Alternatively, an adapter having first and second opposite sides may be positioned between the first end member and the cap.

22 Claims, 5 Drawing Sheets

FIG_3

FIG_4

FIG_5

FIG_6

FIG_7

INTEGRATED ELECTRONICALLY COMMUTATED MOTOR AND CONTROL CIRCUIT ASSEMBLY

FIELD OF THE INVENTION

This invention relates in general to dynamo-electric machines and in particular to an electronically commutated motor and an integrated electronically commutated motor and control circuit assembly.

BACKGROUND OF THE INVENTION

While conventional brush-commutated DC motors may have advantageous characteristics, including convenience of changing operational speeds, there may be disadvantages such as brush wear, electrical loss, noise and radio frequency interference caused by sparking between the brushes and the segmented commutator, which may limit the applicability of such brush-commutated DC motors in some applications. Electronically commutated motors, such as brushless DC motors and permanent magnet motors with electronic commutation, have now been developed and generally are believed to have the above-discussed advantageous characteristics of the brush-commutated DC motors without many of the disadvantages thereof while also having other important advantages. Such electronically commutated motors are discussed in the David M. Erdman U.S. Pat. Nos. 4,015,182 and 4,459,519, for instance. In these patents, a brushless DC motor has a stator with a plurality of windings therein, a rotor having a plurality of constant magnetic polar regions, and means for sensing the relative position of the rotor polar regions with respect to the stator. Positive signals developed by the position sensing means were processed by circuitry for selectively energizing the windings of the motor. These electronically commutated motors are advantageously employed in many different applications, for instance, in air handling systems including a fan for either operating the fan to blow air over cooling coils or to blow cooled air from an air conditioner or warmed air from a furnace into ductwork to be circulated in a building.

The control circuitry required to electronically commutate a brushless DC motor in air handling systems is typically mounted remote from the motor in a location where the circuitry can be adequately cooled and unaffected by motor heat. This arrangement requires additional space for the control circuitry and a cable for connecting the control circuitry to the motor. The cable connecting the control circuitry to the motor emits radio frequency (RF) signals which may interfere with other electrical equipment located near the motor.

In applications where the control circuitry is mounted in proximity to the motor, a dedicated cooling mechanism such as a fan wheel is generally employed to provide the required heat dissipation, i.e., the mechanism is provided primarily for the purpose of cooling the control circuitry. However, the dedicated cooling mechanism results in additional cost and failure of such mechanism results in added maintenance expenses.

Further improvements in control systems, electronically commutated motor systems, and methods of control and operation can beneficially contribute to more widespread use of such motors in air handling systems. Improvements which achieve increased electrical efficiency and user convenience would be desirable. For example, it would be desirable to both reduce the length of the cable connecting the control circuitry to the motor and mount the control circuitry in proximity to the motor in a configuration which would not require a dedicated cooling mechanism.

SUMMARY OF THE INVENTION

Among the objects of this invention are to provide an improved electronically commutated motor and an integral electronically commutated motor and control circuit assembly which overcome at least some of the disadvantageous conditions discussed above; the provision of an improved electronically commutated motor and an integral electronically commutated motor and control circuit assembly which substantially dissipate motor heat and adequately cool the control circuitry; the provision of an improved electronically commutated motor and an integral electronically commutated motor and control circuit assembly which reduces RF signals emitted by the cable connecting the control circuitry to the motor; the provision of an improved electronically commutated motor and an integral electronically commutated motor and control circuit assembly which are reliable, economical and convenient to use.

In general and in one form of the invention a motor assembly includes an adapter having first and second opposite sides. A stationary assembly is adjacent the first side of the adapter and has a plurality of winding stages adapted to be electrically energized to generate an electromagnetic field. A rotatable assembly includes a plurality of permanent magnet elements which are in magnetic coupling relation with the stationary assembly. Control circuitry, including power switching devices, is connected to the winding stages and positioned adjacent the second side of the adapter for controlling the power switching devices for applying a voltage to one or more of the winding stages at a time and for commutating the winding stages in a preselected sequence to rotate the rotatable assembly about an axis of rotation. A cap on the second side of the adapter forms a closure with the adapter within which the control circuitry is located and includes structure integral with and projecting laterally from the cap and electrically insulated from and in heat exchange relationship with the power switching devices for dissipating heat generated by the power switching devices.

In another form of the invention a motor assembly includes a stationary assembly having a plurality of winding stages adapted to be electronically energized to generate an electromagnetic field. A rotatable assembly includes a plurality of permanent magnet elements in magnetic coupling relation with the stationary assembly. First and second substantially flat end members are parallel to each other and have inner facing sides between which the stationary assembly and the rotatable assembly are located. Each of the members has an outer side opposite its inner side. Control circuitry is connected to the winding stages and positioned adjacent the outer side of the first member for applying a voltage to one or more of the winding stages at a time and for commutating the winding stages in a preselected sequence to rotate the rotatable assembly about an axis of rotation. A cap on the outer side of the first member forms a closure with the cap within which the control circuitry is located. A connecting element engaging the second end member and the cap is adapted to urge the second end member and the cap toward each other thereby supporting the first end member, the stationary assembly, and the rotatable assembly therebetween.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figures 1, 2:
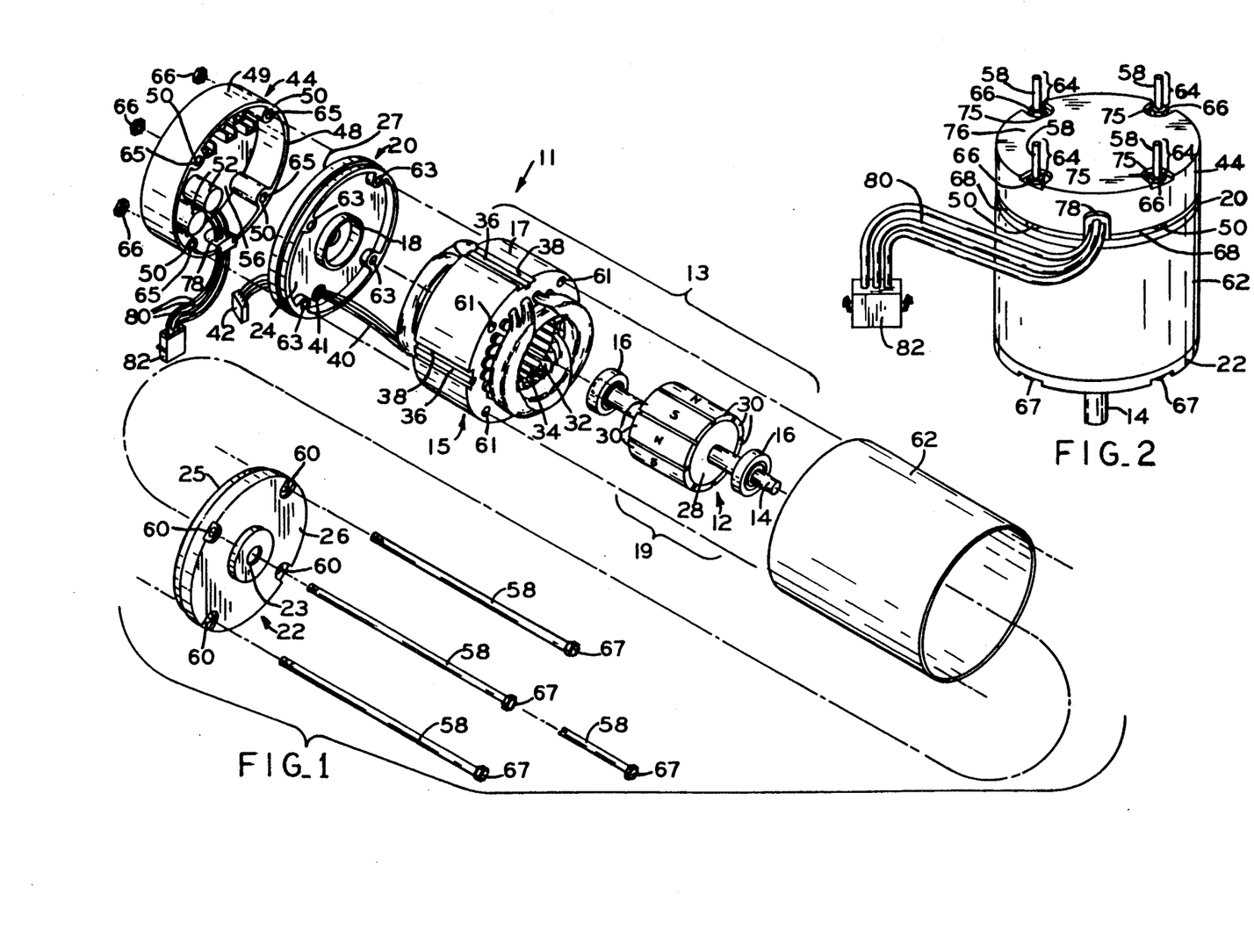
FIG. 1 is an exploded, perspective view of the main elements of an integrated electronically commutated motor and control circuit assembly of the present invention in one form thereof.
FIG. 2 is a perspective view of the integrated motor assembly of FIG. 1 assembled.

Referring to the drawings, and more particularly to FIGS. 1 and 2, reference character 11 generally designates an integrated electronically commutated motor and control circuit assembly in one form of the invention. Motor assembly 11 comprises a brushless electronically commutated DC motor 13 having a stationary assembly 15 including a stator or core 17 and a rotatable assembly 19 including a permanent magnet rotor 12 and a shaft 14. A fan (not shown) or other means to be driven such as means for moving air through an air handling system engages the shaft 14. Specifically, motor assembly 11 is for use in combination with an air handling system such as an air conditioning system including a fan for blowing air over cooling coils for supplying the cooled air to a building.

Rotor 12 is mounted on and keyed to the shaft 14 journaled for rotation in conventional bearings 16. The bearings 16 are mounted in bearing supports 18 integral with a first end member 20 and a second end member 22. The end members 20 and 22 are substantially flat and parallel to each other. The end members 20 and 22 have inner facing sides 24, 25 between which the stationary assembly 15 and the rotatable assembly 19 are located. Each end member 20 and 22 has an outer side 26, 27 opposite its inner side 24, 25. Additionally, second end member 22 has an aperture 23 for the shaft 14 to pass through and extend out from the outer side 26.

The rotor 12 comprises a ferromagnetic core 28 and is rotatable within the bore of stator 17. Eight essentially identical magnetic material elements or relatively thin arcuate segments 30 of permanent magnet material, each providing a relatively constant flux field, are secured, for example, by adhesive bonding to rotor core 28. The segments 30 are magnetized to be polarized radially in relation to the rotor core 28 with adjacent segments 30 being alternately polarized as indicated. While magnets 30 on rotor 12 are illustrated for purposes of disclosure, it is contemplated that other rotors having different constructions and other magnets different in both number, construction, and flux fields may be utilized with such other rotors within the scope of the invention so as to meet at least some of the objects thereof.

Stationary assembly 15 comprises a plurality of winding stages 32 adapted to be electrically energized to generate an electromagnetic field. Stages 32 are coils of wire wound around teeth 34 of the laminated stator core 17. The core 17 may be held together by four retainer clips 36, one positioned within each notch 38 in the outer surface of the core 17. Alternatively, the core 17 may be held together by other suitable means, such as for instance welding or adhesively bonding, or merely held together by the windings, all as will be understood by those skilled in the art. The winding end turns extend beyond the stator end faces and winding terminal leads 40 are brought out through an aperture 41 in the first end member 20 terminating in a connector 42. While stationary assembly 15 is illustrated for purposes of disclosure, it is contemplated that other stationary assemblies of various other constructions having different shapes and with different number of teeth may be utilized within the scope of the invention so as to meet at least some of the objects thereof.

Motor assembly 11 further includes a cap 44 which is mounted on the rear portion of the motor assembly 11 to enclose within the cap 44 control means 46 for the motor 4. The cap 44 includes an edge 48 having a plurality of spacing elements 50 projecting therefrom which engage the outer side 27 of the first end member 20. Cap 44 includes a substantially annular side wall 49 with the top of the side wall 49 forming edge 48. The control means 46 is positioned adjacent the outer side 27 of the first end member 20. The control means 46 includes a plurality of electronic components 52 and a connector 54 (FIG. 3) mounted on a component board 56, such as a printed circuit board. The control means 46 is connected to the winding stages 32 by interconnecting connector 42 and connector 54. The control means 46 applies a voltage to one or more of the winding stages 32 at a time for commutating the winding stages 32 in a preselected sequence to rotate the rotatable assembly 19 about an axis of rotation.

Connecting elements 58 comprising a plurality of bolts pass through bolt holes 60 in the second end member 22, bolt holes 61 in core 8, bolt holes 63 in first end member 20, and bolt holes 65 in cap 44. The head 67 of the connecting elements 58 engage the second end member 22. The connecting elements 58 are adapted to urge the second end member 22 and the cap 44 toward each other thereby supporting the first end member 20, the stationary assembly 6, and the rotatable assembly 19 therebetween. Additionally, a housing 62 may be positioned between the first end member 20 and the second end member 22 for enclosing and protecting the stationary assembly 15 and the rotatable assembly 10.

Electronically commutated motor 13 as described herein merely for purposes of disclosure is a three-stage, eight-pole motor, but it will be understood that the electronically commutated motor of this invention may be of 2, 4, 6, etc. pole construction and have 2, 3, 13 or more winding stages within the scope of the invention so as to meet at least some of the objects thereof.

The motor assembly 11 according to the invention operates in the following manner. When the winding stages 32 are energized in a temporal sequence three sets of eight magnetic poles are established that will provide a radial magnetic field which moves clockwise or counterclockwise around the core 17 depending on the preselected sequence or order in which the stages are energized. This moving field intersects with the flux field of the magnet 30 poles to cause the rotor to rotate relative to the core 17 in the desired direction to develop a torque which is a direct function of the intensities or strengths of the magnetic fields.

The winding stages 32 are commutated without brushes by sensing the rotational position of the rotatable assembly 19 as it rotates within the core 17 and utilizing electrical signals generated as a function of the rotational position of the rotor 12 sequentially to apply a DC voltage to each of the winding stages 32 in different preselected orders or sequences that determine the direction of the rotation of the rotor 12. Position sensing may be accomplished by a position-detecting circuit responsive to the back electromotive force (EMF) to provide a simulated signal indicative of the rotational position of the rotor 12 to control the timed sequential application of voltage to the winding stages 32 of the motor 4. Other means of position sensing may also be used.

FIG. 2 illustrates the fully assembled motor assembly 2. Connecting elements 58 pass through the second end member 22, the stationary assembly 6, the first end member 20, and the cap 44. The connecting elements 58 have a portion 64 which projects laterally from the cap 44. Portion 64 is adapted to engage a support structure (not shown) for supporting the motor assembly 2. The connecting elements 58 may be secured in place by placing a nut 66 engaging the threads on each of the portions 64 of the connecting elements 58.

Spacing elements 50 when engageable with the outer side 27 of the first end member 20 form air gaps 68 between the spacing elements 50, the edge 48, and the outer side 27. The air gaps 68 permit flow through the cap 44 thereby dissipating heat generated by the motor assembly 11. Additionally, if the motor assembly 11 is exposed to rain the air gaps 68 permit rain which has entered the cap 44 to flow out of the cap 44 via the air gaps 68.

Indentations 75 are formed in a bottom 76 of the cap 44 which provide a space for a tool (not shown) to fit in to tighten the nuts 66. The indentations 75 also allow the nuts 66 to be mounted on the connecting elements 58 flush with the bottom 76 of the cap 44.

Figure 3:
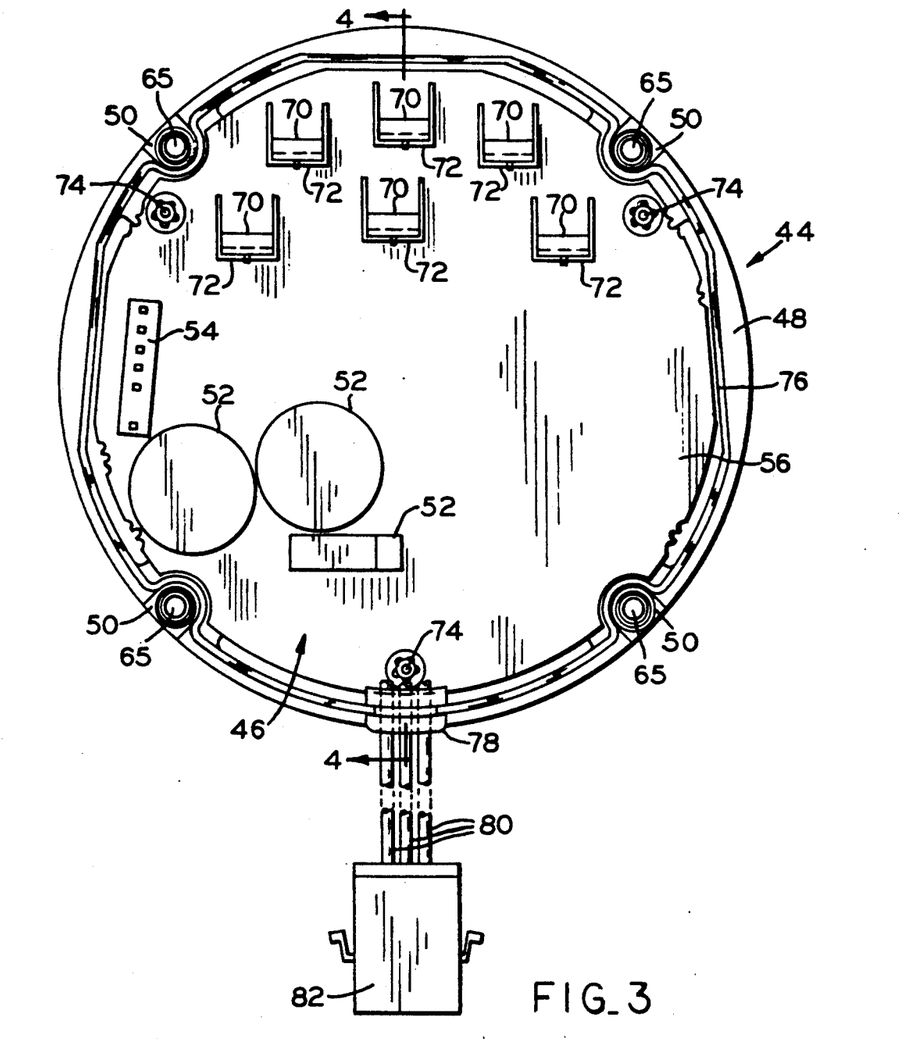
FIG. 3 is a top plan view of a cap of the integrated motor assembly of FIG. 1 including control circuitry.

Referring to FIG. 3, the interior of cap 44 including control means 46 is shown. For simplicity, FIG. 3 only shows some of the components 52. In practice, the electronic components 52 are surface mounted on both sides of the component board 56. In particular, power switching devices 70 such as power transistors are mounted to U-shaped heat sinks 72. Component board 56 is mounted on studs 74 to space the component board 56 above the bottom 76 of the cap 44. Additionally, the electronic components 52 may be coated with, for instance, a resin (not shown) for protecting the components 52 from any dirt or rain which may enter the cap 44 through the air gaps 68.

The spacing elements 50 are integral with bolt holes 65. When connecting elements 58 pass through the bolt holes 65, the spacing elements 50 surround and protect the connecting elements 58.

Cap 44 may also include a gasket 78 for receiving wires 80. One end of wires 80 is connected to the component board 56 and the other end terminates in a connector 82. Connector 82 is connected to an electrical power source (not shown) for powering the control means 46.

Figure 4:
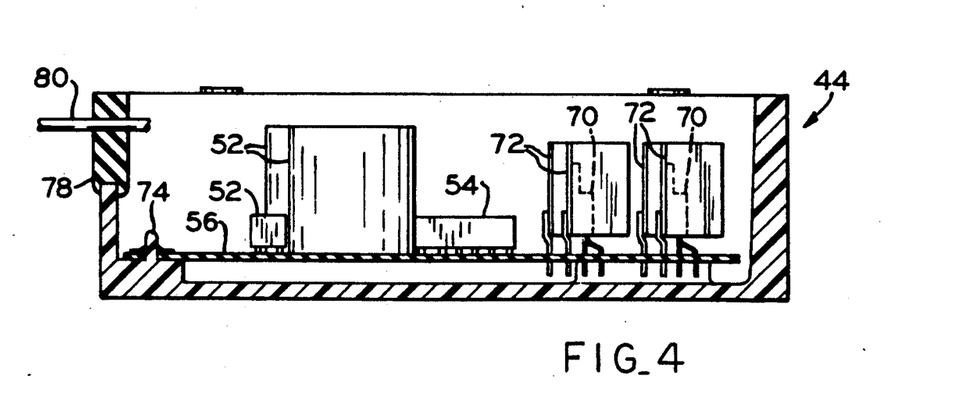
FIG. 4 is a cross-sectional view taken along the line 4—4 of FIG. 3.

FIG. 4 illustrates a cross-sectional view of the cap 44. The component board 56 is mounted on stud 74 to space the component board 56 above the bottom 76 of the cap 44. The power transistors 70 are mounted to the U-shaped heat sinks 72.

Figure 5:
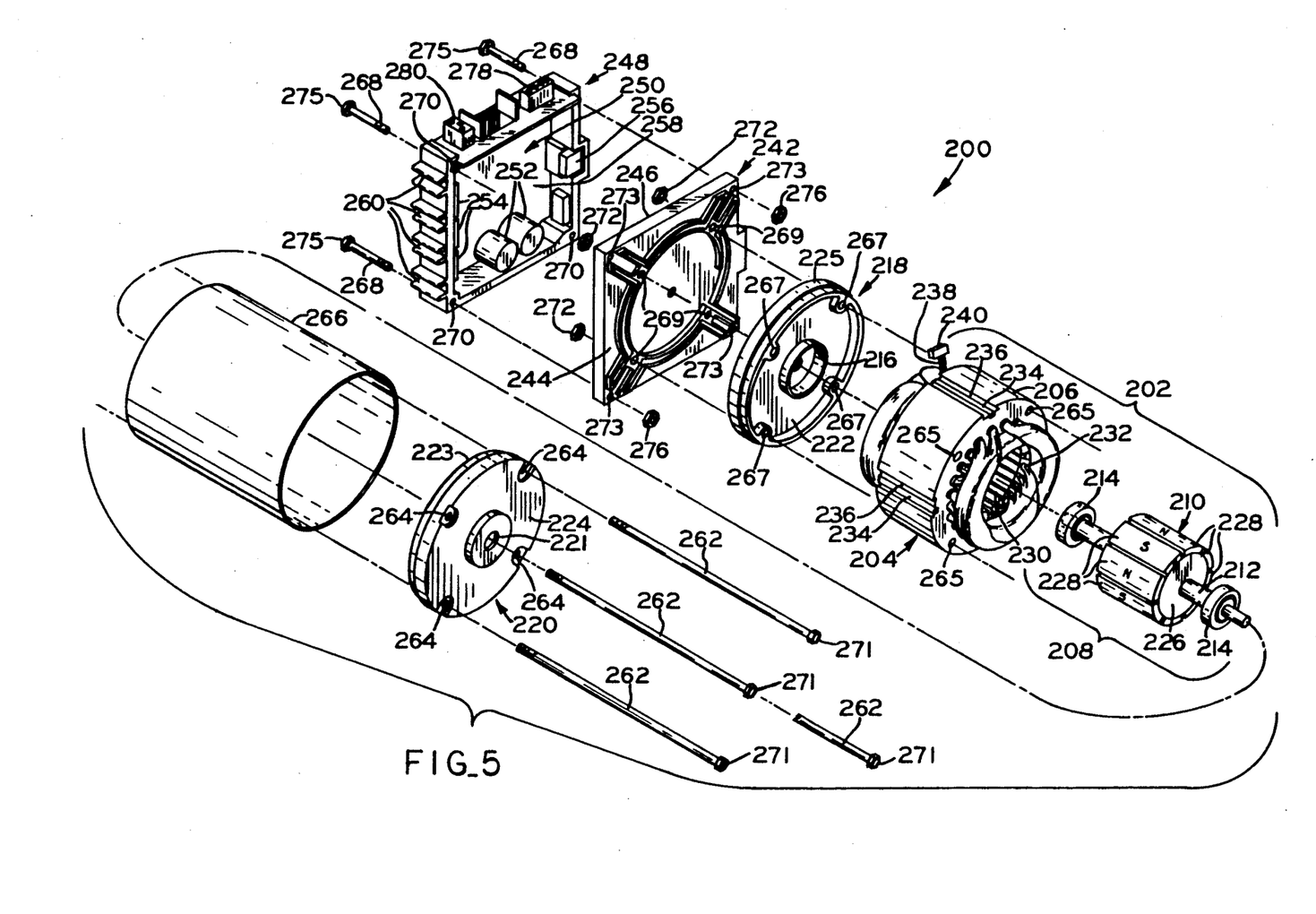
FIG. 5 is an exploded, perspective view of the main elements of an integrated electronically commutated motor and control circuit assembly of the present invention in another form thereof.

FIG. 5 illustrates an integrated electronically commutated motor and control circuit assembly in another form of the invention and designated generally as 200 in the drawings. Motor assembly 200 comprises a brushless electronically commutated DC motor 202 having a stationary assembly 204 including a stator or core 206 and a rotatable assembly 208 including a permanent magnet rotor 210 and a shaft 212. A fan (not shown) or other means to be driven such as means for moving air through an air handling system engages the shaft 212. Specifically, motor assembly 200 is for use in combination with an air handling system such as an air conditioning system or a furnace each including a fan for circulating air in ductwork within a building.

Rotor 210 is mounted on and keyed to the shaft 212 journaled for rotation in conventional bearings 214. The bearings 214 are mounted in bearing supports 216 integral with a first end member 218 and a second end member 220. The end members 218 and 220 are substantially flat and parallel to each other. The first end member 218 has a first peripheral shape such as a circular peripheral shape. The end members 218 and 220 have inner facing sides 222, 223 between which the stationary assembly 204 and the rotatable assembly 208 are located. Each end member 218 and 220 has an outer side 224, 225 opposite its inner side 222, 223. Additionally, the second end member 220 has an aperture 221 for the shaft 212 to pass through and extend out from the outer side 224.

The rotor 210 comprises a ferromagnetic core 226 and is rotatable within the bore of stator 206. Eight essentially identical magnetic material elements or relatively thin arcuate segments 228 of permanent magnet material, each providing a relatively constant flux field, are secured, for example, by adhesive bonding to rotor core 226. The segments 228 are magnetized to be polarized radially in relation to the rotor core 226 with adjacent segments 228 being alternately polarized as indicated. While magnets 228 on rotor 210 are illustrated for purposes of disclosure, it is contemplated that other rotors having different constructions and other magnets different in both number, construction, and flux fields may be utilized with such other rotors within the scope of the invention so as to meet at least some of the objects thereof.

Stationary assembly 204 comprises a plurality of winding stages 230 adapted to be electrically energized to generate an electromagnetic field. Stages 230 are coils of wire wound around teeth 232 of the laminated stator core 206. The core 206 may be held together by four retainer clips 234, one positioned within each notch 236 in the outer surface of the core 206. Alternatively, the core 206 may be held together by other suitable means, such as for instance welding or adhesively bonding, or merely held together by the windings, all as will be understood by those skilled in the art. The winding end turns extend beyond the stator end faces and winding terminal leads 238 are terminating in a connector 240. While stationary assembly 204 is illustrated for purposes of disclosure, it is contemplated that other stationary assemblies of various other constructions having different shapes and with different number of teeth may be utilized within the scope of the invention so as to meet at least some of the objects thereof.

Motor assembly 200 further includes an adapter 242 having a first side 244 and a second, opposite side 246. The first side 244 receives the first peripheral shape and the second side 246 receives a second peripheral shape. End member 218, which has the first peripherical shape such as a circular shape, is mounted on the first side 244. A cap 248, which has the second peripheral shape such as a rectangular peripheral shape, is mounted on the second side 246 to form an enclosure within which a control means 250 is located. The first peripheral shape is different from the second peripheral shape. The control means 250 is positioned adjacent the second side 246. The control means includes a plurality of electronic components 252, power switching devices 254, and a connector 256 mounted on a component board 258, such as a printed circuit board. The control means is connected to the winding stages 230 by interconnecting connector 240 to connector 256. The control means 250 control the power switching devices 254 for applying a voltage to one or more of the winding stages 230 and for commutating the winding stages 230 in a preselected sequence to rotate the rotatable assembly 208 about an axis of rotation. The cap 248 includes means 260 integral with and projecting laterally from the cap 248 and electrically insulated from and in heat exchange relationship with the power switching devices 254 for dissipating heat generated by the power switching devices 254.

Connecting elements 262 comprising a plurality of threaded bolts pass through bolt holes 264 in the second end member 220, bolt holes 265 in core 206, bolt holes 267 in first end member 218, and bolt holes 269 in adapter 242. The head 271 of the connecting elements 262 engage the second side 246 of the adapter 242. The connecting elements 262 are adapted to urge the second end member 218 and the adapter 242 toward each other thereby supporting the first end member 218, stationary assembly 206, and rotatable assembly 210 therebetween. Additionally, a support structure or housing 266 may be positioned between the first end member 218 and the second end member 220 for enclosing and protecting the stationary assembly 206 and the rotatable assembly 210. The housing 266 is adapted to be mounted on an air handler system.

A second set of connecting elements 268 comprising a plurality of threaded bolts pass through bolt holes 270 in the cap 248 and bolt holes 273 in the adapter 242. The head 275 of the connecting elements 268 engage the bottom of the cap 248. The connecting elements 268 are adapted to urge the cap 248 and the adapter 242 toward each other thereby supporting the control means 250 therebetween.

Electronically commutated motor 202 as described herein merely for purposes of disclosure is a three-stage, eight-pole motor, but it will be understood that the electronically commutated motor of this invention may be of 2, 4, 6, etc. pole construction and have 2, 3, 13 or more winding stages within the scope of the invention so as to meet at least some of the objects thereof.

The motor assembly 200 according to the invention operates in the following manner. When the winding stages 230 are energized in a temporal sequence three sets of eight magnetic poles are established that will provide a radial magnetic field which moves clockwise or counter-clockwise around the core 206 depending on the preselected sequence or order in which the stages 230 are energized. This moving field intersects with the flux field of the magnet poles to cause the rotor 210 to rotate relative to the core 206 in the desired direction to develop a torque which is a direct function of the intensities or strengths of the magnetic fields.

The winding stages 230 are commutated without brushes by sensing the rotational position of the rotatable assembly 208 as it rotates within the core 206 and utilizing electrical signals generated as a function of the rotational position of the rotor 210 sequentially to apply a DC voltage to each of the winding stages 230 in different preselected orders or sequences that determine the direction of the rotation of the rotor 210. Position sensing may be accomplished by a position-detecting circuit responsive to the back EMF to provide a simulated signal indicative of the rotational position of the rotor 210 to control the timed sequential application of voltage to the winding stages 230 of the motor 202. Other means of position sensing may also be used.

Figure 6:
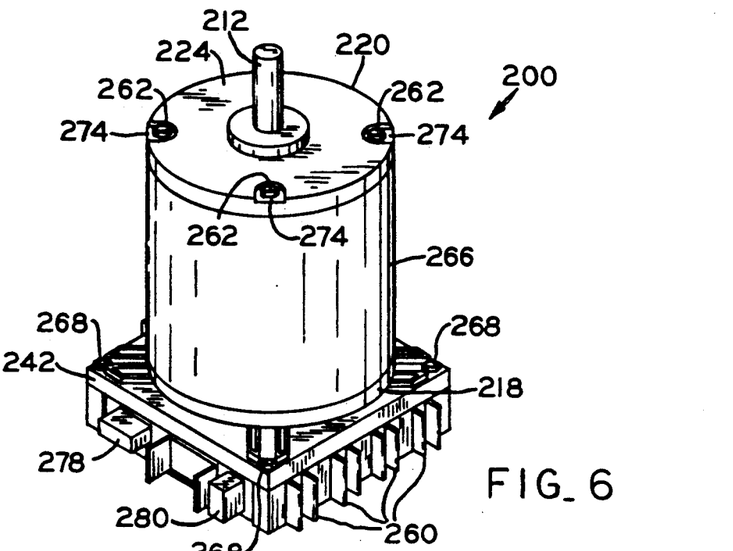
FIG. 6 is a perspective view of the integrated motor assembly of FIG. 5 assembled.

FIG. 6 illustrates the fully assembled motor assembly 200 according to the invention. Connecting elements 262 pass through the second end member 220, core 206, first end member 218, and adapter 242. The connecting elements 262 may be secured in place by placing a nut 272 (FIG. 5) engaging the threads on each end of the connecting elements 262. Indentations 274 are formed in the outer side 224 of the second end member 220 which provide a space for a tool (not shown) to fit in to tighten the nuts 272. The indentations 274 also allow the nuts 272 to be mounted on the connecting elements 262 flush with the outer side 224 of the second end member 220. Also, connecting elements 268 pass through bolt holes 270 in the cap 248 and bolt holes 273 in the adapter 242. The connecting elements 268 may be secured in place by placing a nut 276 (FIG. 5) engaging the threads on each end of the connecting elements 268.

The cap 248 also includes a pair of connectors 278 and 280 for connecting the control means 250 to an electrical power source (not shown).

Figure 7:
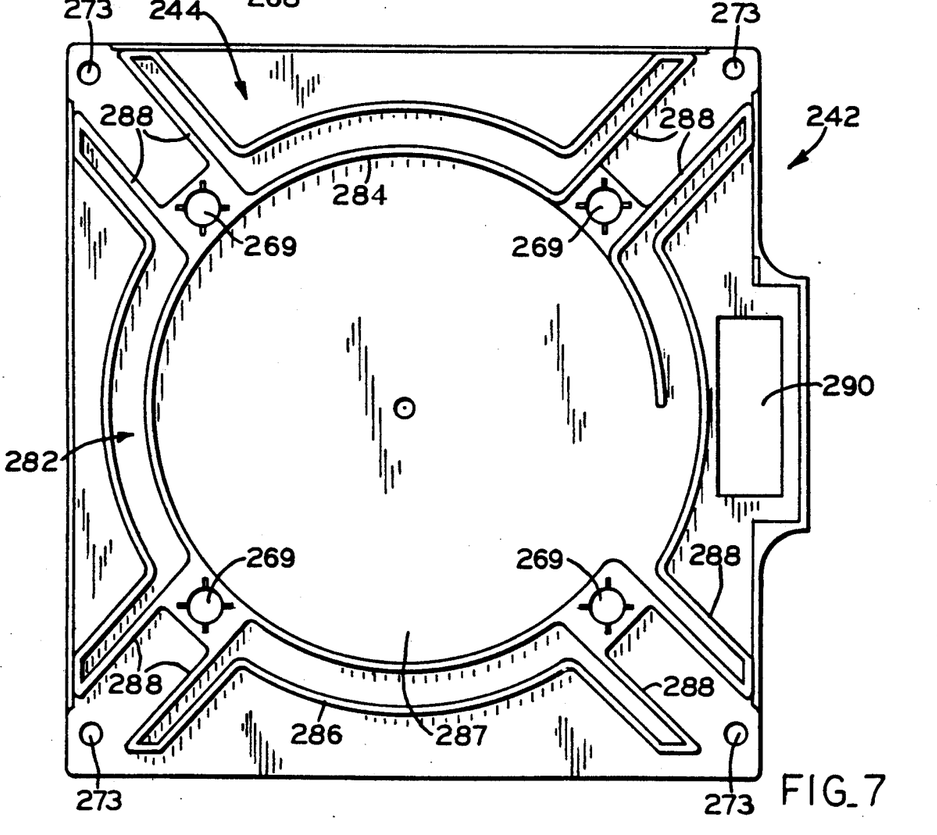
FIG. 7 is a top plan view of an adapter of the integrated motor assembly of FIG. 5.

Referring now to FIG. 7, the first side 244 of adapter 242 is shown. The first side 244 is of a generally rectangular configuration. The first side 244 comprises a ribbed formation 282 for spacing the first end member 218 from the first side 244. The ribbed formation 282 also provides structural integrity and rigidity for the adapter 242. The ribbed formation 282 is engageable with the outer side 222 of the first end member 218. The ribbed formation includes concentric ribs 284 and 286 of circular formation laterally projecting from surface 287 of side 244. The concentric rib 286 includes a plurality of ribs 288 radially extending from the concentric rib 286 to the corners of the first side 244. The first side 244 also includes a generally rectangularly shaped aperture 290 for receiving the connector 240.

The outer side 222 of the first end member 218 includes a rib (not shown) of circular formation having a diameter smaller than the diameter of concentric rib 284. This provides for positive mating of the first end member 218 with the adapter 242 when the two are brought together.

Figures 8, 9:
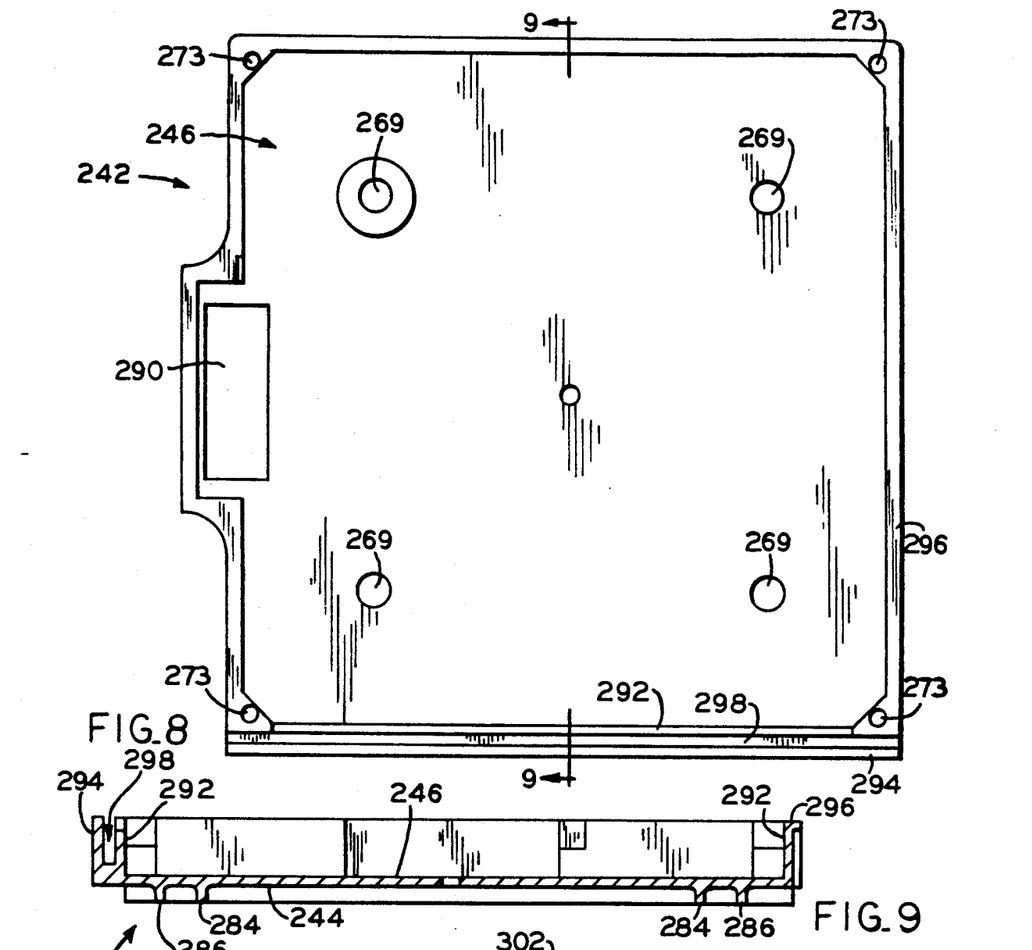
FIG. 8 is a bottom plan view of the adapter of the integrated motor assembly of FIG. 5.
FIG. 9 is a cross-sectional view of the adapter of the integrated motor assembly of FIG. 8 taken along the line 9—9 of FIG. 8.

The second side 246 of the adapter 242 is illustrated in FIG. 8. The second side 246 includes bolt holes 269 which allow the connecting elements 262 to pass through. Additionally, the head 271 of the connecting elements 262 are engageable with the second side 246. The second side 246 also includes bolt holes 273 and aperture 290.

FIG. 9 shows a cross-sectional view of the adapter 242. The adapter 242 includes side walls 292 and 294 which laterally extend from the second side 246. A flange 296 extends from the side wall 296. The flange 296 extends along the perimeter of at least three sides of side wall 292 as is shown in FIG. 8. A slot 298 is formed between side walls 292 and 294.

Figure 10:
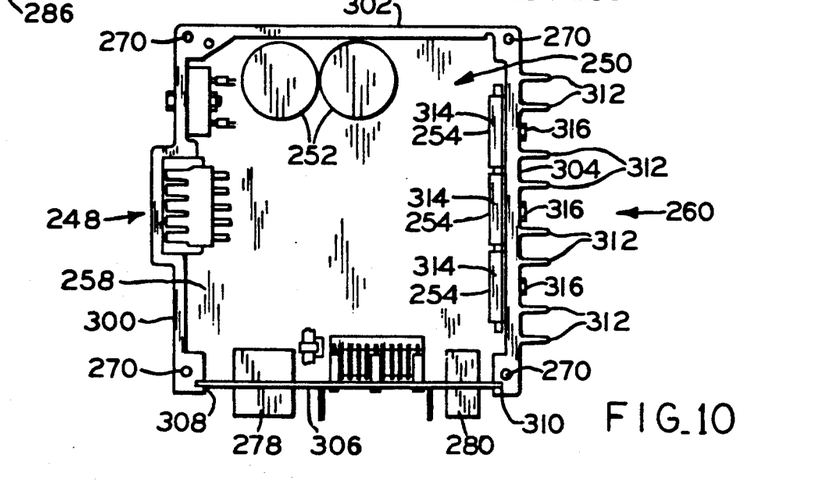
FIG. 10 is a bottom plan view of a cap of the integrated motor assembly of FIG. 5 including control circuitry.

Referring now to FIG. 10, a view of the interior of cap 248 including the control means 250 is shown. Cap 248 includes lateral side walls 300, 302, 304, and a removable side wall 306 which fits into slots 308 and 310 in side walls 300 and 304, respectively. Side wall 306 fits into slot 298 (see FIG. 9). Integral with side wall 304 is the means 260 integral with and projecting laterally from the cap 248 and electrically insulated from and in heat exchange relationship with the power switching devices 254 for dissipating heat generated by the power switching devices 254. The dissipating means 260 comprises a plurality of fins 312 projecting from side wall 304 of the cap 248. For simplicity, FIG. 10 only shows some of the components 252. In practice, the electronic components 252 are surface mounted on both sides of the component board 258. In particular, power switching devices 254 are mounted to a heat sink 314 which is connected to side wall 304 by fastening means such as screws 316.

In view of the above, it will be seen that the several objects of the invention are achieved and other advantageous results attained.

As various changes could be made in the above constructions without departing from the scope of the invention, it is intended that all matter contained in the above descriptions or shown in the accompanying drawings shall be interpreted as illustrative and not in a limiting sense.

What is claimed is:

1. A motor assembly comprising:
    an adapted having first and second opposite sides;
    a stationary assembly on the first side of said adapter and having a plurality of winding stages adapted to be electrically energized to generate an electromagnetic field;
    a rotatable assembly including a plurality of permanent magnet elements in magnetic coupling relation with said stationary assembly;
    control means including power switching devices, said control means connected to the winding stages and positioned adjacent the second side of said adapter, for controlling said power switching devices for applying a voltage to one or more of the winding stages at a time and for commutating the winding stages in a preselected sequence to rotate the rotatable assembly about an axis of rotation;
    a cap on the second side of said adapter, said power switching devices disposed on the cap, said cap including means integral with and projecting laterally from the cap and electrically insulated from and in heat exchange relationship with said power switching devices for dissipating heat generated by said power switching devices wherein said adapter is positioned between the stationary assembly and the rotatable assembly on the first side thereof and the control means and the cap on the second side thereof; and
    said cap and said adapter forming a closure within which said control means is located.

2. The assembly of claim 1 further comprising first and second substantially flat end members parallel to each other and having inner facing sides between which said stationary assembly and said rotatable assembly are located, each of said members having an outer side opposite its inner side, said first end member located between said stationary assembly and said adapter.

3. The assembly of claim 2 wherein the outer side of the first end member has a first peripheral shape and the cap has a second peripheral shape, the first side receives the first peripheral shape and the second side receives the second peripheral shape.

4. The assembly of claim 3 wherein the first peripheral shape is different from the second peripheral shape.

5. The assembly of claim 2 further comprising a second connecting element engaging the adapter and the first end member and adapted to urge the adapter and the second end member toward each other.

6. The assembly of claim 5 wherein said first connecting element comprises a plurality of bolts which pass through the adapter, the first end member, the stationary assembly, and the second end member.

7. The assembly of claim 6 further comprising a second connecting element engaging the adapter and the cap and adapted to urge the adapter and the cap toward each other.

8. The assembly of claim 7 wherein said second connecting element comprises a plurality of bolts which pass through the cap and the adapter.

9. A motor assembly comprising:
    an adapter having first and second opposite sides;
    a stationary assembly on the first side of said adapter and having a plurality of winding stages adapted to be electrically energized to generate an electromagnetic field;
    a rotatable assembly including a plurality of permanent magnet elements in magnetic coupling relation with said stationary assembly;
    first and second substantially flat end members parallel to each other and having inner facing sides between which said stationary assembly and said rotatable assembly are located, each of said members having an outer side opposite its inner side, said first end member being located between said stationary assembly and said adapter;
    a ribbed formation located on the first side of the adapter for spacing the first end member from the first side;
    control means including power switching devices, said control means connected to the winding stages and positioned adjacent the second side of said adapter, for controlling said power switching devices for applying a voltage to one or more of the winding stages at a time and for commutating the winding stages in a preselected sequence to rotate the rotatable assembly about an axis of rotation; and
    a cap on the second side of said adapter forming a closure with the adapter within which said control means is loated and including means integral with and projecting laterally from the cap and electrically insulated from and in heat exchange relationship with said power switching devices for dissipating heat generated by said power switching devices wherein said adapter is positioned between the stationary assembly and the rotatable assembly on the first side thereof and the control means and the cap on the second side thereof and wherein said adapter substantially blocks communication between the stationary assembly and the rotatable assembly on the one side and the control means on the other side.

10. The assembly of claim 9 wherein the ribbed formation comprises concentric ribs of circular formation.

11. The assembly of claim 10 wherein the concentric ribs comprises a plurality of ribs extending from the outer one of the concentric ribs.

12. The assembly of claim 1 wherein the dissipating means comprises a plurality of fins projecting from a side of the cap.

13. The assembly of claim 2 further comprising a housing between said first and second end members.

14. The assembly of claim 2 wherein the rotatable assembly comprises a shaft which projects through the second end member, the shaft having means for engaging a device to be driven.

15. A motor assembly comprising:
a stationary assembly having a plurality of winding stages adapted to be electrically energized to generate an electromagnetic field.
a rotatable assembly including a plurality of permanent magnet elements in magnetic coupling relation with said stationary assembly; and
first and second substantially flat end members parallel to each other and having inner facing sides between which said stationary assembly and said rotatable assembly are located, each of said members having an outer side opposite its inner side;
control means, connected to the winding stages and positioned adjacent the outer side of said first member, for applying a voltage to one or more of the winding stages at a time and for commutating the winding stages in a preselected sequence to rotate the rotatable assembly about an axis of rotation;
a cap on the outer side of said first member forming a closure with the first member within which said control means is located, the cap including an edge having a plurality of spacing elements engageable with the outer side of said first member adapted to permit airflow through the cap thereby dissipating heat generated by the assembly; and
a connecting element engaging the second end member and the cap and adapted to urge the second end member and the cap toward each other thereby supporting the first end member, the stationary assembly and the rotatable assembly therebetween.

16. The assembly of claim 15 wherein said connecting element has a portion which projects laterally from the cap, said portion adapted to engage a support structure for supporting the motor assembly.

17. The assembly of claim 16 wherein said connecting element comprises a plurality of bolts which pass through the first end member and the stationary assembly.

18. The assembly of claim 17 wherein said plurality of bolts pass through the cap and the second end member.

19. The assembly of claim 15 wherein said control means includes a component board including power switching devices and U-shaped heat sinks in heat exchange relationship with the power switching devices for dissipating heat generated by the power switching devices.

20. The assembly of claim 19 further comprising means for mounting the component board above a bottom of the cap.

21. The assembly of claim 15 wherein the rotatable assembly includes a shaft which projects through the second end member, the shaft having means for engaging a device to be driven.

22. A motor assembly comprising:
a stationary assembly having a plurality of winding stages adapted to be electrically energized to generate an electromagnetic field;
a rotatable assembly including a plurality of permanent magnet elements in magnetic coupling relation with said stationary assembly; and
first and second substantially flat end members parallel to each other and having inner facing sides between which said stationary assembly and said rotatable assembly are located, each of said members having an outer side opposite its inner side;
control means, connected to the winding stages and positioned adjacent the outer side of said first member, for applying a voltage to one or more of the winding stages at a time and for commutating the winding stages in a preselected sequence to rotate the rotatable assembly about an axis of rotation;
a cap on the outer side of said first member forming a closure with the first member within which said control means is located, the cap including bolt holes and an edge having a plurality of spacing elements engageable with the outer side of said first member adapted to permit airflow through the cap thereby dissipating heat generated by the assembly, the spacing elements being integral with the bolt holes; and
a connecting element engaging the second end member and passing through the bolt holes in the cap and adapted to urge the second end member and the cap toward each other thereby supporting the first end member, the stationary assembly and the rotatable assembly therebetween.

* * * * *